Patented Jan. 6, 1953

2,624,727

UNITED STATES PATENT OFFICE 2,624,727

RECOVERY OF SEAWEED MUCILAGE

Victor Charles Emile Le Gloahec, Rockland, Maine, assignor to Algin Corporation of America, New York, N. Y., a corporation of Delaware No Drawing. Application December 9, 1947, Serial No. 790,726

25 Claims. (Cl. 260—209)

This invention relates to the treatment of seaweeds and relates particularly to the recovery of mucilaginous material from seaweeds which contain mucilaginous material found in marine plants of the Gigartinaceae family.

At many locations along the seashores of the American continent and the coasts of Europe and Asia, quantities of seaweeds of the Floridea type are encountered which contain mucilaginous or gel-forming material of a polyuronide nature. The mucilaginous material is the kind found in marine plants of the Gigartinaceae family. Among them one may mention as typical *Chondrus crispus, Fucus crispus,* carragheen (Irish moss), *Gigartina pistilla, Gigartina mammillosa, Gracillaria lichenoide, Gelidium corneum,* and *Gelidium cartilageneum.*

For many years past the mucilaginous material in these seaweeds has been utilized by drying the seaweeds in the sun, and then, preferably after they have been pulverized, boiling them in water or any other liquid which will cause the mucilaginous material to go into solution to form a viscous liquid which is used as a thickener or as a clarifying agent in a large number of food and industrial applications. For food purposes, particularly certain desserts (seaweed jelly, blancmange, etc.) the utilization of this mucilaginous material goes back to very remote origins.

The utilization of the mucilaginous material contained in the seaweeds as recovered by the crude procedure above mentioned was attended with a number of drawbacks due to liberation of undesirable organic and mineral products, due to objectionable odor and color, and due to the presence of insoluble matter such as cellulose, silica, etc. Heretofore attempts have been made to overcome the objectionable features of the crude procedure above mentioned by extracting mucilaginous material from the dried and powdered seaweed. Basically these improved methods which have been employed have consisted in first subjecting the seaweed to a quick washing with cold fresh water to demineralize the seaweed to the limited extent that is possible without dissolving the mucilaginous material to any considerable degree. The washed seaweed is then heated in a fresh water medium, the duration of the treatment and the temperature varying with the character of the seaweed and the technique of the particular producer. By this treatment mucilaginous material is dissolved and the insoluble material is separated from the syrup by filtration. The syrup is then evaporated and dried either on drums or by the spraying method. Bleaching may be accomplished either before or after the filtration.

Instead of evaporating and drying, some manufacturers of Irish moss extract by the method referred to above prefer to precipitate the mucilaginous material in the syrup by means of alcohol and then dry the resulting coagulum under vacuum. Certain manufacturers, particularly in the case of agar agar prefer to separate the mucilaginous material from the syrup by freezing the syrup and then separating the colloid from the ice by crushing. The recovered colloid can then be returned to normal temperature and dried, usually by circulation of hot air.

The extracted mucilaginous material prepared as above described was superior to that prepared by the original crude procedures as regards freedom from contaminating substances, and such extracts of gelose, agar agar or Irish moss widened the use of mucilaginous material recovered from seaweeds. However, such improved procedures have been beset with difficulties that have not heretofore been overcome. Thus, purification from impurities has not been complete. Moreover, a principal difficulty has been the very serious impairment of the desired properties of the mucilaginous material resulting from the processing treatment.

This mucilaginous material as it naturally occurs in seaweeds of the type above mentioned is most commonly referred to in the literature as "gelose." However, since in the practice of this invention this naturally occurring mucilaginous material is materially modified while nevertheless retaining its mucilaginous and viscosity-imparting characteristics in high degree, the material in question both in its naturally occurring state and as recovered according to this invention is referred to herein and in the claims as mucilaginous material.

The mucilaginous material contained in seaweeds is of value in food products and for industrial purposes because of its physical characteristic as a thickener for increasing the viscosity of aqueous media, rather than because of its chemical characteristics. The mucilaginous material in the fresh seaweed is highly polymerized and its viscosity-increasing properties are due to this high degree of polymerization. It would be desirable to recover the mucilaginous material from the seaweed in a pure condition and without impairment of its polymerization. However, by methods heretofore practiced it has not been possible to do so for it has not been possible to separate the mucilaginous material with adequate yield from the seaweed cellulose without employment of such high temperatures maintained over considerable periods of time that a serious breakdown of the mucilaginous material results. In fact these prior methods for recovering the mucilaginous material depend upon the breakdown of the mucilaginous material for its separation from the seaweed cellulose. Moreover, certain organic substances present with the seaweed cellulose accelerate the breakdown of the mucilaginous material during the processing steps for its recovery.

It is an object of this invention to provide a method whereby the difficulties heretofore encountered in the recovery of mucilaginous material from seaweeds are overcome. It is a principal object of this invention to recover the mucilaginous material contained in seaweeds in a very highly polymerized condition that is much more effective as a thickener and as a gel-forming agent as compared with mucilaginous material prepared by prior processes. It is a further object of this invention to recover mucilaginous material from seaweeds in an extremely pure condition. It is a further object of this invention to provide pretreatment of the seaweed whereby it may be stored more effectively than by methods heretofore practiced. More generally, the object of this invention, is to afford certain pretreating steps not heretofore known or practiced whereby mucilaginous material contained in seaweed may be separated from seaweed cellulose and impurities with high yield to produce a product characterized by high purity and high polymerization and further characterized by well determined chemical and physical constants. In so far as prior techniques are concerned for filtration, drying, etc. any regarded as preferable may be employed in the practice of this invention and this invention is to be distinguished from merely being another technique for carrying out such operations, for this invention introduces basically new treatments of the seaweed whereby mucilaginous material contained therein may be recovered having the improved characteristics mentioned.

The nature of the problem involved in attempting to recover mucilaginous material from seaweed and the nature of such compounds may be illustrated in connection with the carrageen mucilage in Irish moss. Recent studies of carrageen mucilage indicate the presence of disulfate esters of a type similar to fucoidine, which may be represented by the following formula:

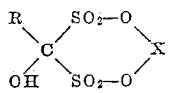

in which R represents a chain of varying lengths of d-galactose residues, and X represents a metal cation.

Information as to the nature of the cation or cations contained in the disulfate ester material is not definite although the presence of calcium is recognized. However, my investigations have indicated the presence of mixed metalorganic complexes having different physical properties resulting from differences in the fixating cation. Thus the presence of at least two such metalorganic complexes containing different metals as cations is definitely shown by reason of the fact that their separation can be effected depending on the temperature at which their dissolution takes place in fresh water. One ester or class of esters is cold soluble in the form of a viscous solution. Another ester or class of esters requires heat for going into a viscous solution, and remains in the form of a viscous solution at the temperature at which the dissolution is effected but turns into a gel upon cooling. It is thus seen that the mucilaginous material as naturally occurring in marine plants of the Gigartinaceae family contains a plurality of metals as cations in metalorganic complexes.

It is a feature of this invention that seaweed is subjected to pretreatment to effect cation exchange with a bath of an aqueous solution of a salt containing a selected metal cation so as to convert the mucilaginous material in the seaweed to chemical combination with the selected cation. In this manner, the number of cations in the naturally occurring mucilaginous material can be reduced and under optimum conditions of control the number of cations fixed upon the mucilaginous material can be reduced to one. Moreover, this cation can be selected so as to convert the mucilaginous material in the seaweed to a compound which is favorable to dissolution at low temperatures, thereby avoiding the necessity for having recourse to high temperatures at which the objective of obtaining dissolution is attained only by reason of molecular disaggregation of the more stable complexes with resulting serious impairment of the viscosity-producing characteristics of the recovered material.

It is a further feature of this invention that after the pretreatment step above mentioned whereby cation exchange is effected, the pretreated seaweed is subjected to mechanical disintegration in an aqueous medium to liberate the mucilaginous material from the seaweed cellulose, and thereby promote the passage of the mucilaginous material into the aqueous medium so that it can be readily separated from the cellulose without resort to high temperatures.

It is a further feature of preferred practice of this invention that the mucilaginous material contained in the seaweed is rendered more stable and less sensitive to molecular breakdown during the recovery process, by elimination of certain organic compounds during the pretreating steps which, if present during the processing, would actively react on the mucilaginous material to cause disaggregation thereof during processing and particularly when the mucilaginous material is subjected to the severe variations in temperature that are incident to present accepted manufacturing methods.

It is a further feature of this invention that the seaweed is placed in condition such that the step of separating of the mucilaginous material from the seaweed can be effected rapidly and at low temperatures.

It is a further feature of this invention that the recovered mucilaginous material after separation from insoluble material in the seaweed may be subjected to further ion exchange whereby final products of well controlled chemical and physical attributes based on cation content arbitrarily chosen are produced.

It is a further feature of this invention that storage of seaweed is permitted over a period of many months without fermentation or molecular degradation.

Further purposes, features and advantages of this invention will be apparent from the following description of an operation which is typical of preferred practice, although it is to be understood that the operations described are illustrative rather than limiting.

The initial step in the process consists in the pretreatment of the seaweed with concentrated saline solution. This is done methodically by contacting the seaweed with a succession of baths of the solution. To accomplish this pretreatment the seaweed, e. g., Irish moss, either fresh or dried may be placed in a storage tank. A saline solution which has been found to be very effective for the purposes of this invention is a solution of sodium chloride. The concentration of the solution preferably is about 20% to 25%. The seaweed in the storage tank is covered with the salt solution, the quantity of the salt solution being sufficient to cover the seaweed in the tank. For example, in the case of fresh seaweed one quart of salt solution can be used per pound of seaweed. When dried seaweed is used, one gallon of the salt solution can be used per pound of the dried seaweed.

After the seaweed has been covered with the salt solution it is permitted to soak at atmospheric temperature. A soaking period of twenty-four hours is convenient and adequate. After the conclusion of this period the salt solution is drained off and the soaking and draining treatments are repeated preferably twelve times. These operations can, of course, be carried out using but a single tank and supplying fresh salt solution for each soaking treatment. However, in order to conserve salt solution it has been found convenient to employ a battery of twelve storage tanks which may be regarded as numbered from 1 to 12 consecutively. In such case in starting up the operation fresh salt solution is first used to cover the seaweed in tank No. 1. After the seaweed in tank No. 1 has soaked in the salt solution for twenty-four hours, the salt solution is drained from tank No. 1 and is passed into tank No. 2 to cover seaweed in tank No. 2, and fresh salt solution is used to cover the seaweed which remains in tank No. 1. This progressive passage of the salt solution from one tank to another in the battery after each soaking period while the seaweed remains in the respective tanks is repeated until the seaweed in tank No. 1 has received twelve soaking treatments of twenty-four hours each. The seaweed in tank No. 1 can then be removed and replaced by untreated seaweed, whereupon this untreatd seaweed is covered with the contaminated salt solution taken from tank No. 12 and fresh salt solution is used to cover the seaweed in tank No. 2. After the next twenty-four hour treatment the seawed in tank No. 2 is removed and replaced by untreated seaweed and this methodical treatment can be continued indefinitely. After the salt solution has been passed through all the tanks in the battery it can be discarded.

During the successive soaking periods in the salt solution the mucilaginous material in the seaweed does not go into solution, and there is no fermentation or degradation thereof. Moreover, there is no swelling of the seaweed. However, while the mucilaginous material does not go into solution, substances which cause seaweed odor and pigmentation, as well as the bulk of the nitrogenous matter, certain enzymes and furfuran derivatives which have a tendency to degrade the mucilaginous material during processing, do go into solution. After five or six soaking treatments with intermediate draining these substances which do go into solution are removed. Thus according to the operations described there is a thorough washing out of soluble impurities and contaminants which tend to cause degradation of the mucilaginous material during subsequent processing steps. This is made possible by the employment of the concentrated salt solution which prevents the mucilaginous material from going into solution and which prevents fermentation and degradation notwithstanding prolonged immersion in the aqueous medium. Thorough purification had not been acomplished according to prior techniques due to the fact that when seaweed is washed with water the mucilaginous material tends to go into solution and it is for this reason that according to prior methods only an extremely limited amount of washing to remove contaminating impurities was regarded as possible and purification was not accomplished in an adequate way.

In addition to washing out impurities while the mucilaginous material in the seaweed remains undissolved and undegraded, there is a cation exchange between the mucilaginous material and the salt. During each soaking period the cation exchange comes to equilibrium or approaches equilibrium, and during the successive soaking periods the cation exchange becomes progressively more complete. The employment of twelve successive soaking periods of twenty-four hours each has been found to afford a virtually complete cation exchange, so that after the completion of the successive soaking treatments the mucilaginous material is essentially free of combined cations with the exception of the cation derived from the salt contained in the salt solution, namely, sodium in the case of the present example according to which the salt used is sodium chloride.

It is preferable that the salt solution used during the soaking periods be adjusted as to pH so that the pH will be between about 10 and about 10.5 for reasons that are explained more in detail below. This pH value can readily be accomplished as by adding a small quantity of sodium hydroxide to the sodium chloride solution that is used.

After the soaking pretreatment with salt solution has been completed, the seaweed has been conditioned for separation of the mucilaginous material from the seaweed cellulose. While the seaweed is still covered with the salt solution used for the last soaking period, any alkalinity of the salt solution is preferably neutralized as by the addition of a small amount of acid, e. g., hydrochloric acid, so that the mass is made substantially neutral. The salt solution is then drained from the seaweed, and the seaweed is subjected to two or three rapid washings with fresh water. For example, for each washing the seaweed may be covered with fresh water which is left in contact with the seaweed for about fifteen minutes and then drained off. When the cation which has been introduced into the metal-organic mucilaginous material is sodium any substantial further contact with fresh water is not desirable inasmuch as the mucilaginous material begins to dissolve with resultant loss in the wash water, and the seaweed begins to swell.

After the salt has thus been washed from the seaweed, the seaweed is put into a tank containing fresh water, the tank being provided with suitable agitating means for maintaining the mass stirred continuously and at an even rate notwithstanding increase in the viscosity of the mass. The amount of water employed may conveniently be about five times the weight of the seaweed. Complete disintegration and maceration of the seaweed is accelerated by pumping the mixture through a hammer mill of the wet grinding type or through a colloid mill. Generally it is desirable to reduce the seaweed so that the solid particles will pass through a 200 mesh sieve. By this operation the mucilaginous material which is soluble but viscous is liberated from the insoluble components of the seaweed, and there is formed a viscous smooth pasty mass consisting of the solid particles suspended in the viscous solution of the mucilaginous material dissolved in water.

By virtue of the pretreating steps above mentioned the seaweed and liberated mucilaginous material has been placed in condition such that filtration can be accomplished rapidly and at low temperature. Since the mucilaginous material has already been carried into solution it is not necessary to employ heat or prolonged soaking to dissolve the mucilaginous material as had been regarded as essential according to prior known methods of manufacture, and any heating that is effected is merely that which may be regarded as desirable to reduce the viscosity of the mass so that filtration may be accelerated. It is usually convenient to conduct the filtration at a temperature of the order of 40° to 65° C. In order to bring the mass to this temperature while maintaining the mass in the heated condition for a minimum period of time, the mass which is at atmospheric temperature is conducted through a heat exchanger such as tubing surrounded by a steam chest in being passed to the filter so that the mass will become heated to the temperature range indicated in only three or four minutes and immediately prior to the filtration.

The filtration can be accomplished by any suitable type of equipment of which many are well known, e. g., a filter press, cylinder type filter, or the like. If desired the separation can likewise be accomplished by a centrifugal machine.

The foregoing steps accomplish the recovery of the mucilaginous material. For commercial marketing, the recovered syrup can be further treated, according to conventional practice, so as to produce the mucilaginous material in dry form. Thus those operations hereinabove referred to may be employed such as drum or spray drying, coagulation with alcohol, freezing, etc., as may be regarded as convenient.

As the result of the foregoing operations a product is produced which is greatly superior to products produced by previously known methods. Since the primary commercial value of the recovered product lies in its viscosity-producing properties, these properties are of very great significance. When Irish moss has been treated according to this invention as above described, the recovered carragheen was such that a 1% solution at 25° C. had a viscosity of from 1200 to 1800 centipoises. Even higher viscosities have been obtained. By contrast, the best carragheen product heretofore on the market as recovered from Irish moss by known processing methods affords a viscosity of only 120 to 200 centipoises in a 1% solution at 25° C. In other words, the carragheen product recovered according to this invention is many times as effective for a given weight as compared with such products as previously produced, which means that for accomplishing a given desired viscosity of an aqueous product the amount of recovered carragheen required as recovered by the process of this invention is only a small fraction of that which would be required to obtain a similar viscosity using carragheen recovered by other methods.

Moreover, the product produced according to this invention is of greater purity than products produced by methods heretofore known, and the product as produced according to this invention can be produced with better control as to its properties.

While the practice of this invention has been described in connection with a typical example for purposes of illustration, it is apparent that the principles utilized may be availed of in other ways. Thus with regard to the soaking treatment, the salt used in the salt solution for effecting ion exchange may be some salt other than sodium chloride. In selecting the salt particular attention should be given to the cation for it is largely immaterial what anion is combined with the metal cation. Ordinarily in the practice of this invention the use of chloride salts is preferred because chlorides appear to give to the seaweed after the soaking treatments a physical condition that is especially well adapted for the subsequent filtration operation. However, other salts may be employed such as sulphates, nitrates, carbonates, phosphates, and even salts of organic acids. The only qualification is that the salt must be sufficiently soluble to permit the formation of a solution of at least about 10% concentration. Moreover, the salt should not be excessively acidic in its reaction, namely, in aqueous solution the pH of the solution should not be below 6.5.

With regard to the cation that is selected, any metal cation will be operable in the sense that the mucilaginous material in the seaweed can be converted by the soaking treatments to a form wherein cations other than the cation of the selected salt may be eliminated thereby facilitating the recovery of the mucilaginous material in the seaweed according to this invention. However, certain metals are toxic or result in color and these factors must be taken into consideration, particularly when the mucilaginous material that is recovered is to be used in food products or in the preparation of food products. Therefore those salts which have been found to be best suited for the practice of this invention are salts of metals selected from the group consisting of sodium, potassium, calcium, magnesium and ammonium.

The particular cation that is selected depends on the properties that result from its use, for different cations result in some differences as to the properties of the recovered product. Thus when sodium is used, the mucilaginous material is converted to a metalorganic complex that either at normal temperatures or at moderately elevated temperature occurs in the form of a viscous solution. Therefore when sodium is used the treated seaweed can be filtered at atmospheric temperatures, if desired, although slight warming to a temperature of 40° C. to 65° C., as mentioned above, decreases the viscosity of the syrup and permits more rapid filtration without materially degrading the recovered mucilaginous material.

When the cation is magnesium, the mucilaginous material that is recovered exhibits a higher viscosity at normal atmospheric temperatures than when the cation is sodium, but upon heating, the viscosity falls off more rapidly than is the case with sodium, with the result at elevated temperatures the viscosity of the magnesium complex is less than that of the sodium. Because of these phenomena, when magnesium is used as the cation of the salt, with which the seaweed is treated, the filtration should be caused to occur at a temperature of about 60° C. or slightly greater in order that the rate of filtration may be sufficiently great. Further in connection with the employment of magnesium, it may be mentioned that the mucilaginous material in the seaweed forms with magnesium a more stable metal organic compound than is the case when sodium is used, particularly with regard to resistance of physical action. Moreover, when the cation employed is magnesium, the seaweed after the soaking treatment can be washed with cold water without danger of dissolving out the mucilaginous material due to the lower solubility of the magnesium complex under such conditions.

When the cation employed is potassium the differences as compared with sodium are generally similar to the differences between sodium and magnesium only to an even greater degree. Thus in the case of potassium as the cation contained in the mucilaginous material, the aqueous solution at ordinary atmospheric temperature is of gel consistency, but upon heating, the aqueous solution becomes very fluid. When potassium is used the filtration step can advantageously be carried out at a temperature of about 80° C.

Calcium as the cation is quite similar to magnesium in its effect on the mucilaginous material. When calcium is used the filtration step can advantageously be carried out at a temperature of about 75° C.

When ammonium is employed its effect on the mucilaginous material is quite similar to that of sodium, although the aqueous solutions are even less affected by temperature variations and can be filtered very readily at atmospheric temperatures. However, ammonium is somewhat less desirable than sodium because the resulting complex is less stable.

It is seen from the foregoing that the salt that is used for the soaking treatment is one wherein the cation is selected having the foregoing considerations in mind, including the temperature at which the filtration is to be carried out and the properties that are desired in the recovered product. Ordinarily that cation is selected which affords the best degree of colloidal dispersion in fresh water combined with stability, whereby the pretreated seaweed can be filtered cold or at moderate temperatures such as 40° C. to 65° C. with maximum efficiency and speed and with minimum adverse effect on the viscosity-producing properties of the recovered mucilaginous material. For most purposes, therefore, salts of sodium or of magnesium are preferred for carrying out the preliminary soaking treatments whereby the cation exchange is effected.

In effecting the successive soaking treatments during which the cation exchange takes place, it may be mentioned that the rate of osmosis through the membranes of the seaweed is relatively slow. Each successive soaking treatment for the purpose of introducing the selected cation into the mucilaginous material contained in the seaweed requires a substantial period of time in order to establish equilibrium between the inner and outer solutions as regards cation concentrations. As stated above, soaking for about 24 hours is adequate for closely approaching such equilibrium conditions. Of course, the rate of cation exchange is more rapid initially when the disequilibrium is greatest and slows up as equilibrium is reached. It is not necessary to reach the equilibrium conditions for each successive soaking treatment and, if desired, one can use shorter soaking periods and a greater number of successive soaking treatments and accomplish a similar end. As each successive soaking treatment takes place the cation other than that in the salt solution is progressively diminished in the naturally occurring mucilaginous material in the seaweed, and the cation of the selected salt is substituted therefor. It is preferable to continue the treatments until the only cation in the mucilaginous material in the seaweed is that of the selected salt. This usually requires about 12 soaking treatments of the type hereinabove described with reference to a typical example of the practice of this invention wherein equilibrium conditions are closely approached during each of the successive treatments. While this represents optimum utilization of this invention, the advantages resulting from the cation exchange can be realized but to lesser degree if the cation exchange is carried out to lesser degree of completeness as by use of a lesser number of soaking treatments.

When the soaking treatments are being carried out the rate of the cation exchange can be accelerated by reducing the seaweed to relatively small pieces. In practical commercial operations disintegration of the seaweed into pieces about ½ inch in length has been found to be advantageous.

The concentration of the salt solution that is used for the soaking pretreatment should be such that during the soaking treatment there will not be any substantial degradation of the mucilaginous material as the result of fermentation. Moreover, the seaweed should not undergo excessive swelling and the mucilaginous material should not go into solution to any substantial extent at the prevailing temperature at which the soaking treatments are carried out, which ordinarily is atmospheric temperature. In the practice of this invention consistently with the foregoing, the concentration of the salt solution should be at least about 10%. However, this is to be regarded as the minimum and in order to afford greater security and in order to make the cation exchange occur more rapidly, greater concentration may be employed up to the limit of saturation of the solution in the salt. For most purposes a concentration of the salt solution of the order of 20% to 25% is the most suitable.

The mucilaginous material contained in the seaweed is subject to degradation under excessively acid or under excessively alkaline conditions although alkali tolerance is greater than acid tolerance in this regard. For this reason the pH of the salt solution used in the soaking treatments should not be below 6.5. On the other hand, the pH of the solution should not exceed about 10.5. In practicing this invention it has been found that when the pH of the salt solution used in the soaking treatments is on the alkaline side within the limits of tolerance above mentioned, the seaweed is caused to occur in a condition better suited for rapid filtration. For this reason the pH of the salt solution employed is preferably adjusted so that it will be about 8.5 to about 10.5, and optimum results are afforded when the pH of the salt solution is adjusted so as to be between about 10 and about 10.5. In adjusting the pH to this moderate degree of alkalinity it is recommended, although it is not indispensable, that the alkali added to the salt solution to increase the pH value be an alkali containing the same cation as that of the salt contained in the solution. If the cation of the alkali is different, the suggested procedure is to maintain the pH by the addition of the alkali during say ten soaking treatments and then follow these treatments with about three or four soaking treatments using fresh salt solutions from which the alkali is omitted. If the sole object of the soaking treatment were cation exchange the adjustment of the alkalinity to the extent indicated would not serve a useful purpose. However, when this adjustment of the alkalinity of the salt solutions is practiced a superior product is recoverable, particularly when treating fresh seaweed. Alkalies which may be used to adjust the alkalinity of the salt solutions include sodium and potassium hydroxides, soda ash, lime, ammonia, etc.

When the final treatment wherein the seaweed is soaked in the salt solution utilizes a salt solution adjusted so as to be slightly alkaline as stated above, it is normally desired to recover the mucilaginous material in essentially neutral condition. Therefore, as stated hereinabove, it is normally preferable after the conclusion of the last soaking treatment to neutralize the alkalinity of the salt solution in the bath by means of an acid, and any acid may be used for this purpose. Mineral acid such as hydrochloric, sulphuric, nitric or the like may be employed although organic acids may be used if desired.

The pretreating soaking treatments with saline solution as described above both generally and in connection with a typical manufacturing procedure places the seaweed in condition such that the mucilaginous material can then be extracted therefrom to obtain the advantages mentioned hereinabove. The successive soaking treatments followed in each case by drainage effectively removes contaminants and the mucilaginous material in the seaweed is converted to a form that is unique as far as its chemical characteristics are concerned, particularly with regard to the metal cation contain therein, but the molecular composition may not be uniform as regards the degree of polymerization, i. e., as regards the length of the chain composed of galactose or similar residue.

As regards the subsequent separation of the mucilaginous material from the solids including the seaweed cellulose, removal of excess salt is desirable by washing with fresh water. After this washing treatment the rate at which the separation can be effected at minimum temperature elevation can be greatly increased by the thorough disintegration of the treated seaweed as by the use of a hammer mill or a colloid mill while the seaweed is suspended in water. The mucilaginous material in the seaweed is already dissolved and as the result of the mechanical action the mucilaginous material is liberated and the mixture can be converted into a smooth pasty mass or a homogeneous gel depending on the cation chosen for fixation. When the mass has been reduced to this condition it is readily susceptible to separation of the syrup from the solids by any conventional operation appropriate for the purpose such as filtration or centrifugal separation. After these pretreating steps it is not necessary to use elevated temperature to liberate the mucilaginous material from the seaweed, as had previously been regarded as essential with resulting severe degradation of the mucilaginous material, and if the temperature is raised at all during the process, the temperature can be moderate and applied for only a short time merely as a means for controlling viscosity during a simple filtration operation or the equivalent.

It is, of course, the case that by virtue of the pretreating steps whereby the seaweed is soaked in salt solution to effect cation exchange, that the extracted mucilaginous material will contain but a single cation depending on the cation contained in the treating salt. As mentioned above, the properties of the recovered mucilaginous material will vary somewhat depending on the cation selected, and the particular properties desired will indicate the selection of the cation. It is thus seen that the properties and physical constants of the recovered material is subject to control.

While the properties of the mucilaginous material as initially recovered are affected by the cation contained in the mucilaginous material, the recovered product as separated from the insoluble constituents of the seaweed can be subjected to a further cation exchange. Thus the cation contained in the salt used in the pretreating soaking steps can be selected from the point of view of suitability for the recovery procedure, and after the recovery has been completed the recovered material can be treated further so as to introduce the cation or cations desired in the ultimate product as determined by the properties sought. For this purpose any of the well known ion exchanging or zeolite materials may be employed. One type of such zeolite material is carbonaceous, and can be produced from carbonaceous materials such as wood, coal, lignite, etc., by treatment with substances such as fuming sulphuric acid, chlorosulphuric acid or zinc chloride to produce a granular product which has cation exchange power. Resinous zeolites are also well known such as the resinous material formed by reaction of a methylene body such as formaldehyde with a polyhydric alcohol body such as quebracho tannin (Patent No. 2,104,501). These and other zeolite materials exhibit cation exchange properties and can be used. Thus, for example, if the cation contained in the recovered mucilaginous solution is magnesium, passage of an aqueous solution of the recovered material over a zeolite operating on the sodium cycle will replace the magnesium cation in the mucilaginous material with sodium. By a converse type of operation mucilaginous material containing sodium as the cation can be converted to mucilaginous material containing magnesium as the cation. Any other ion exchange is also possible. Such operations are usually effected by passing the solution through a column for intimate contact with the ion exchange material until the ion exchange material is spent and then regenerating the ion exchange material. If it should be desired that the ultimate product should contain two or more cations, it is possible to separate the initially recovered mucilaginous material into separate portions and subject the separate portions to ion exchange operations so as to produce portions of recovered syrup containing different cations. These different portions can thereafter be mixed and the proportions of the blend will determine the proportions of the different metal cations in the mixture. After the mixture has been made one should ordinarily subject it to thorough mixing as by agitation so as to insure uniformity. In this manner it is seen that products of predetermined composition and properties under accurate control can be produced, as may be desired for particular commercial applications and uses.

Another feature and advantage of this invention results from the fact that the concentrated saline solution permits conservation of the fresh seaweed during the period of time between harvesting and manufacture. The harvesting of seaweed is seasonal and it is normally desirable to store it for considerable periods of time. If the freshly harvested seaweed is left standing without drying, it soon starts to ferment and the fermentation breaks down the mucilaginous material contained in the seaweed. For this reason, it has been common practice to dry the freshly harvested seaweed. However, if the dried seaweed is stored for three or four months there is substantial degradation of the mucilaginous material contained therein. Moreover, the drying of the seaweed involves considerable expense. By covering the freshly harvested seaweed with the salt solution of the concentration mentioned above, namely, at least 10% concentration, the seaweed can be stored indefinitely without degradation of the mucilaginous material contained therein or impairment of its physical properties.

It is apparent from the foregoing that the present invention permits the recovery of the mucilaginous material from seaweed which is greatly superior in its desired physical properties as compared with that recovered by prior known methods. Moreover, it is also superior as regards its purity and the control respecting its chemical and physical attributes. This has been accomplished by an economical procedure, for the salts which may be advantageously employed are inexpensive and the solutions can be handled by simple pumping or gravitational flow operations. Moreover, such materials and operations do not involve expense beyond that incident to processes heretofore employed wherein the seaweed is dried and later is subjected to protracted extraction usually with boiling. Moreover, since a given weight of the mucilaginous material recovered according to this invention is many times as effective for its intended uses as compared with products produced by prior methods, the present invention affords extremely great economies from the standpoint of commercial applications of the recovered product.

I claim:

1. In a process for the recovery of mucilaginous material from seaweed containing mucilaginous material found in plants of the Gigartinaceae family, the step comprising soaking the seaweed in an aqueous salt solution having a concentration of about 10% to about 25% and a pH between about 6.5 and about 10.5 and containing a cation selected from the group consisting of sodium, potassium, calcium, magnesium and ammonium to effect cation exchange with the mucilaginous materials in the seaweed prior to separation of said mucilaginous material from the insoluble material of the seaweed.

2. In a process for the recovery of mucilaginous material from seaweed containing mucilaginous material found in plants of the Gigartinaceae family, the step comprising soaking the seaweed in successive aqueous baths of at least about 10% concentration having a pH between about 6.5 and about 10.5 of a water soluble salt containing a cation selected from the group consisting of sodium, potassium, calcium, magnesium and ammonium to effect cation exchange with the mucilaginous material contained in the seaweed prior to separation of said mucilaginous material from the insoluble material in the seaweed.

3. In a process according to claim 2, the step according to claim 2 wherein the pH of a plurality of said baths is between about 8.5 and about 10.5.

4. In a process according to claim 2, the step according to claim 2 wherein said salt is a chloride.

5. In a process according to claim 2, the step according to claim 2 wherein said salt is a sodium salt.

6. In a process according to claim 2, the step according to claim 2 wherein said salt is a magnesium salt.

7. In a process according to claim 2, the step according to claim 2 wherein the number of said successive baths is at least about 12.

8. In a process for the recovery of mucilaginous material from seaweed containing mucilaginous material found in plants of the Gigartinaceae family, the steps comprising soaking the seaweed in successive baths of aqueous solution of about 10% to about 25% of concentration at a pH between about 6.5 and about 10.5 of a water-soluble salt containing a cation selected from the group consisting of sodium, potassium, calcium, magnesium and ammonium with intermediate drainage between the successive baths to remove soluble impurities and to effect progressive cation exchange between said mucilaginous material and said salt during said successive baths whereby the cation contained in said salt is caused to become the cation contained in said mucilaginous material, washing the seaweed with water to remove excess salt, and treating the seaweed in an aqueous medium to separate insoluble material contained in the seaweed from mucilaginous material dissolved in the aqueous medium.

9. In the process of claim 8, the steps according to claim 8 wherein asid solution used for a plurality of said bath in alkaline and wherein said alkalinity is neutralized prior to the separation step.

10. In the treatment of seaweed containing mucilaginous material found in plants of the Gigartinaceae family, the storage of the seaweed in a solution having a concentration of at least about 10% and a pH between about 6.5 and about 10.5 of a salt containing as the cation a metal selected from the group consisting of sodium, potassium, calcium, magnesium and ammonium thereby preventing fermentation and degradation of the mucilaginous material contained in the seaweed during the storage period.

11. In a process for the recovery of mucilaginous material from seaweed containing mucilaginous material found in plants of the Gigartinaceae family, the steps comprising soaking the seaweed in an aqueous salt solution of at least about 10% concentration having a pH between about 6.5 and about 10.5 and containing a cation selected from the group consisting of sodium, potassium, calcium, magnesium and ammonium to effect cation exchange with the mucilaginous material in the seaweed, removing excess salt from the seaweed, reducing the seaweed containing the mucilaginous material while in an equeous medium to a smooth viscous mass by mechanical disintegration, and thereafter separating the insoluble material contained in the aqueous mass from mucilaginous material dissolved in the aqueous medium.

12. In a process for the recovery of mucilaginous material from seaweed containing mucilaginous materials found in marine plants of the Gigartinaceae family, the steps comprising soaking the seaweed in successive baths of aqueous solution of at least about 10% concentration having a pH between about 6.5 and about 10.5 of a water-soluble salt containing a cation selected from the group consisting of sodium, potassium, calcium, magnesium and ammonium with intermediate drainage between the successive baths to remove soluble impurities and to effect progressive cation exchange between said mucilaginous material and said salt during said successive baths, washing the so-treated seaweed with water to remove excess salt, reducing the seaweed containing the mucilaginous material to a smooth viscous aqueous mass by mechanical disintegration in the presence of water, and thereafter separating the insoluble material contained in the aqueous mass from the dissolved mucilaginous material.

13. In the process of claim 12, the steps according to claim 12 wherein said separation step is carried out at a temperature not greater than about 80° C.

14. In the process of claim 12, the steps according to claim 12 wherein said smooth aqueous mass is formed at substantially atmospheric temperature and is heated immediately prior to the separation step to lower the viscosity of the aqueous mass for facilitating the separation effected by the separation step.

15. In the process of claim 12, the steps according to claim 12 wherein said smooth aqueous mass is formed at substantially atmospheric temperature and wherein said separation step is carried out at a temperature not greater than about 65° C.

16. In the process of claim 12, the steps according to claim 12 wherein said seaweed is reduced by said mechanical disintegration until the particles of the insoluble material contained in the aqueous mass are of the order of size passing a 200 mesh sieve.

17. In a process for the recovery of mucilaginous material from seaweed containing mucilaginous material found in plants of the Gigartinaceae family, the steps comprising washing the seaweed with an aqueous medium to remove soluble impurities, and reducing the washed seaweed while mixed with water to a viscous smooth mass by mechanical disintegration until the particles of insoluble material are reduced to the order of size passing a 200 mesh sieve thereby liberating from the disintegrated insoluble material the mucilaginous material in dissolved condition in said water, and separating the resulting water solution of dissolved mucilaginous material from said disintegrated insoluble material.

18. In a process for the recovery of mucilaginous material from seaweed containing mucilaginous material found in plants of the Gigartinaceae family, the steps comprising soaking the seaweed in successive aqueous baths of at least about 10% concentration having a pH between about 6.5 and about 10.5 of a water-soluble salt containing a cation selected from the group consisting of sodium, potassium, calcium, magnesium and ammonium to effect cation exchange with the mucilaginous material contained in the seaweed, treating the so-treated seaweed while in an aqueous medium to separate insoluble material from dissolved mucilaginous material, and treating the dissolved mucilaginous material with a cation exchange material to effect a further cation exchange with the mucilaginous material in the solution.

19. In the process of claim 18, the steps according to claim 18 and wherein different portions of the recovered solution of mucilaginous material are treated separately with cation exchange material containing different cations, and thereafter are blended to provide mucilaginous material containing predetermined relative amounts of different metal cations.

20. In the process of claim 18, the steps according to claim 18 wherein the solution of recovered mucilaginous material after the cation exchange has been effected is mixed with recovered solution as to which the cation exchanged has not been effected to provide a solution of mucilaginous material containing predetermined relative amounts of different metal cations.

21. In a process for the recovery of mucilaginous material from seaweed containing mucilaginuous material found in plants of the Gigartinaceae family which as it naturally occurs in the seaweed contains a plurality of metals as cations in metalorganic combination, the step which comprises soaking the seaweed in baths of aqueous solution of at least 10% concentration having a pH between about 6.5 and about 10.5 of a salt containing a cation selected from the group consisting of sodium, potassium, calcium, magnesium, and ammonium, said seaweed being successively soaked in said baths until the cation content of said mucilaginous material is limited essentially to the cation contained in said salt prior to separation of said mucilaginous material from the insoluble material of the seaweed.

22. A process for the recovery of mucilaginous material from seaweed containing the mucilaginous material found in plants of the Gigartinaceae family which as it naturally occurs in the seaweed contains a plurality of metals as cations in metalorganic combination which process comprises contacting the seaweed with an aqueous solution of at least about 10% concentration and having a pH between about 6.5 and about 10.5 of a salt of a metal cation selected from the group consisting of sodium, potassium, calcium, magnesium and ammonium to effect cation exchange between said salt and the mucilaginous material in said seaweed to convert mucilaginous material in said seaweed to chemical combination with said selected metal as cation, washing the salt solution from the seaweed, liberating the mucilaginous material from the insoluble material of the seaweed by mechanical disintegration of the seaweed in an aqeous medium to form a mixture of said insoluble material and said mucilaginous material dissolved in said aqueous medium, and separating the dissolved mucilaginous material from said insoluble material.

23. A process for the recovery of mucilaginous material from Irish moss which comprises soaking the Irish moss in an aqueous solution at a pH between about 6.5 and about 10.5 having a concentration of at least about 10% of a salt containing a cation selected from the group consisting of sodium, potassium, calcium, magnesium, and ammonium a plurality of times with drainage between successive soaking treatments until the cation content of the mucilaginous material in the Irish moss is limited essentially to the cation contained in said salt, washing the so treated Irish moss with water to remove excess salt without substantial removal of mucilaginous material therefrom, distributing the washed Irish moss in water and reducing it by mechanical disintegration while distributed in water to a smooth viscous mass wherein the insoluble particles are of the order of size passing a 200 mesh testing sieve, and separating the insoluble material from the dissolved mucilaginous material at a temperature not above about 80° C.

24. A process according to claim 23 wherein the pH of the solution employed in a plurality of the soaking steps is between about 10 and about 10.5.

25. In a process according to claim 1, the step according to claim 1 wherein said salt consists essentially of sulphate.

VICTOR CHARLES EMILE LE GLOAHEC.

REFERENCES CITED

The following references are of record in the file of this patent:

UNITED STATES PATENTS

| Number | Name | Date |
| --- | --- | --- |
| 2,516,023 | Siehrs | July 18, 1950 |

FOREIGN PATENTS

| Number | Country | Date |
| --- | --- | --- |
| 187,970 | Great Britain | Nov. 15, 1923 |

OTHER REFERENCES

Mantell, "Water-Soluble Gums," 1947, pages 99 and 103, 2 pages.

Haas et al., Ann. Applied Biol., V. 7 (1921), pages 355–357, 3 pages.

Hoffman et al., J. Biol Chem., V. 65 (1925), pages 372, 377, 378, 3 pages.